UNITED STATES PATENT OFFICE.

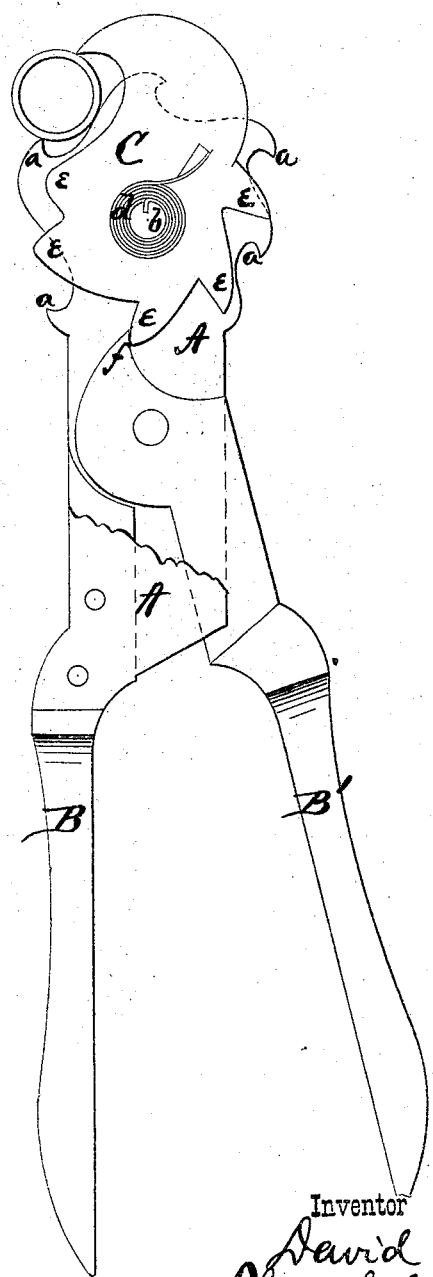

DAVID FRANK AND THEOPHILUS SNYDER, OF ALLENTOWN, PENNSYLVANIA.

IMPROVEMENT IN PIPE-WRENCHES.

Specification forming part of Letters Patent No. 119,838, dated October 10, 1871.

*To all whom it may concern:*

Be it known that we, DAVID FRANK and THEOPHILUS SNYDER, of Allentown, in the county of Lehigh and in the State of Pennsylvania, have invented certain new and useful Improvements in Pipe-Tongs or Wrench; and do hereby declare that the following is a full, clear, and exact description thereof, reference being had to the accompanying drawing and to the letters of reference marked thereon making a part of this specification.

The nature of our invention consists in the construction and arrangement of a pipe-wrench, as will be hereinafter more fully set forth.

In order to enable others skilled in the art to which our invention appertains to make and use the same, we will now proceed to describe its construction and operation, referring to the annexed drawing which represents a side view of our wrench, a portion of one of the side plates being removed.

A A represent two side pieces made of cast-steel and riveted or otherwise secured to the handle B at their lower ends. The upper ends of the side pieces A A are somewhat enlarged, and provided around their edges with a series of graduated hooks, $a\ a$; that is, the hooks $a\ a$ gradually increase in size from one side to the other. Through the upper ends of these side pieces passes a pin or short shaft, $b$, which is firmly secured in said side pieces. In this shaft is fastened one end of a spring, $d$, which is coiled around the shaft, and the other end of said spring is fastened in a hook, C, as shown in the drawing. This hook C is placed over the shaft and spring, the hook part projecting beyond the side pieces A A, and bent in the opposite direction from the hooks $a\ a$. Around the edge of that part of the hook C which is, so to say, inclosed by the side pieces A A, is a series of teeth, $e\ e$, of unequal size. Below the hook C, and between the side pieces C C, is pivoted the other handle B′, the upper end of which forms a tooth or pawl, $f$. It will readily be seen that by turning the hook C backward the pipe may be laid on any of the hooks $a\ a$, and the spring $d$ will force the hook C against the other side of the pipe, and then, by pressing inward on the handle B′, the tooth $f$ on said handle will engage with one of the teeth $e$ on the hook C, and thus press said hook hard on the pipe, so as to turn the same. By means of the graduated hooks $a\ a$ any size pipe may be operated upon by the same wrench, from the smallest to the largest.

Having thus fully described our invention, what we claim as new, and desire to secure by Letters Patent, is—

1. The side pieces A A, attached to a handle, B, and provided with graduated hooks $a\ a$, and used in combination with a hook or other suitable device to grasp and hold pipe of various sizes, substantially as herein set forth.

2. The hook C provided with teeth $e\ e$, and pivoted between and used in combination with suitable side pieces, and a device for forcing the hook upon the pipe to hold the same, substantially as herein set forth.

3. The combination of the side pieces A A with graduated hooks $a\ a$, the hook C, and a spring, $d$, suitably arranged to throw the hook C down upon a pipe laid in the hooks $a\ a$, substantially as herein set forth.

4. The combination of the side pieces A A with hooks $a\ a$, hook C with teeth $e\ e$, handles B B′, tooth $f$, and with or without a spring, $d$, all constructed and arranged substantially as and for the purposes herein set forth.

In testimony that we claim the foregoing we have hereunto set our hands and seals this 5th day of August, 1871.

DAVID FRANK. [L. S.]
THEOPHILUS SNYDER. [L. S.]

Witnesses:
EDWIN W. FRIED,
HENRY T. KLECKNER.

(100)